United States Patent [19]
Takamuki

[11] Patent Number: 6,021,420
[45] Date of Patent: Feb. 1, 2000

[54] MATRIX TRANSPOSITION DEVICE

[75] Inventor: Hideharu Takamuki, Kanagawa, Japan

[73] Assignee: Sony Corporation, Tokyo, Japan

[21] Appl. No.: 08/974,958

[22] Filed: Nov. 20, 1997

[30] Foreign Application Priority Data

Nov. 26, 1996 [JP] Japan .................................. 8-314766

[51] Int. Cl.[7] ................................................. G06F 17/14
[52] U.S. Cl. ............................................................ 708/401
[58] Field of Search ..................................... 708/400–402

[56] References Cited

U.S. PATENT DOCUMENTS

| | | | |
|---|---|---|---|
| 5,481,487 | 1/1996 | Jang et al. | 708/401 |
| 5,644,517 | 7/1997 | Ho | 708/401 |
| 5,805,476 | 9/1998 | Kim et al. | 708/401 |

*Primary Examiner*—Tan V. Mai
*Attorney, Agent, or Firm*—Hill & Simpson

[57] ABSTRACT

A matrix transposition device with which speed of processing such as a two-dimensional orthogonal transformation can be raised, wherein there is provided of a plurality of storage devices 22-0 to 22-p arranged so as to be able to input input column vectors in parallel and output output column vectors in parallel, the sum of the address ranges being enough to store all element data of the input matrix; a plurality of input selection devices 21-0 to 21-p capable of selecting one numerical value input from among a plurality of parallel numerical value inputs and inputting selected numerical value to corresponding storage devices; a plurality of address generators 23-0 to 23-p capable of designating independent addresses with respect to the storage devices; output selection devices 24-0 to 24-n capable of respectively independently selecting outputs of any storage devices; and a control device 25 which performs a control so that elements of any input row vectors are stored in different storage devices at the time of input and control so that any transposed output column vectors are output in parallel while maintaining the determined order and the order of elements in the determined column vectors in accordance with the matrix elements stored in the plurality of storage devices at the time of output.

9 Claims, 8 Drawing Sheets

MATRIX TRANSPOSITION DEVICE

BACKGROUND OF THE INVENTION

1. Field of the Invention

The present invention relates to a matrix transposition device used in a specialized processing apparatus or general purpose processing apparatus for efficiently processing operations requiring two-dimensional orthogonal transformation and other transposition operations used in the field of image compression etc.

2. Description of the Related Art

Conventionally, those of the processing apparatuses requiring two-dimensional orthogonal transformation and other transposition operations of matrix data such which require a high speed processing perform primary transformation or a processing equivalent to the primary transformation on the input matrix data by a plurality of processors, store the resultant matrix data in storage devices, take the matrix data out of the storage devices to perform a transposition operation on it, then input it to the next processing circuit for primary transformation or processing equivalent to the primary transformation.

In the matrix transposition operation, however, data must be read N number of times until the data of amount of one column become complete. This operation has become an obstacle when trying to perform the two-dimensional orthogonal transformation etc. at a high speed or in a short time.

SUMMARY OF THE INVENTION

An object of the present invention is to provide a matrix transposition device capable of raising the speed of the two-dimensional orthogonal transformation and other processing.

To achieve the above object, according to the first aspect of the present invention, there is provided a matrix transposition device for applying a transposition action on input column vectors to obtain output column vectors, having a plurality of storage devices arranged so as to be able to receive as their inputs the input column vectors in parallel and so as to be able to output output column vectors in parallel, the sum of the address ranges able to store all element data of the input matrix, and having a controlling means for storing element data of any input row vectors in different storage devices and outputting any transposed output column vectors in parallel while maintaining a determined order and an order of element data in the determined column vectors in accordance with the stored matrix elements.

According to a second aspect of the present invention, there is provided a matrix transposition device for applying a transposition action on input column vectors to obtain output column vectors, having a plurality of storage devices arranged so as to be able to receive as their inputs the input column vectors in parallel and so as to be able to output output column vectors in parallel, the sum of the address ranges able to store all element data of the input matrix; a plurality of selecting means each provided corresponding to one of the plurality of storage devices, capable of selecting one numerical value input from among a plurality of parallel numerical value inputs, and inputting the respectively selected numerical values to the corresponding storage device; a plurality of address generating means capable of designating independent addresses with respect to the plurality of storage devices; and a controlling means for controlling the selecting means and address generating means so that the elements of any input row vectors can be stored in different storage devices at the time of input and controlling the address generating means so that any transposed output column vectors can be output in parallel while maintaining a predetermined order and order of elements in the determined column vectors in accordance with the matrix elements stored in the plurality of storage devices.

According to the present invention, for example the plurality of storage devices may be arranged so that the storage regions form a matrix shape and the controlling means may circularly shift the addresses and cause the element data forming one column vector to be stored in storage regions of different column addresses in the plurality of storage devices. Addresses may then be designated in the same column units of the matrix so as to output parallel output vectors.

Alternatively, for example, the plurality of data columns may be shifted and the element data forming one column vector may be stored in storage regions of the same column addresses in the plurality of storage devices and the addresses may be circularly shifted to output parallel output vectors.

By this, a high speed transposition operation can be realized and the speed of processing of two-dimensional orthogonal transformation etc. can be raised.

Further, it is also possible for the present matrix transposition device to input and output a rectangular matrix. It can be used in for example for a specialized processing device for performing two-dimensional orthogonal transformation, a specialized processing device for performing the two-dimensional orthogonal transformation used in an image compression apparatus or image expansion apparatus, or part of a general purpose processing device which sometimes performs two-dimensional orthogonal transformation.

BRIEF DESCRIPTION OF THE DRAWINGS

These and other objects and features of the present invention will become more apparent from the following description of the related art and preferred embodiments given with reference to the attached drawings, in which:

FIGS. 3A to 3F are views explaining a concrete operation in the case of 8×8 two-dimensional discrete cosine transformation (DCT), in which FIGS. 4A to 4F are views for explaining another concrete operation in the case of 8×8 two-dimensional DCT, in which

DESCRIPTION OF THE PREFERRED EMBODIMENTS

Before describing the preferred embodiments, a more detailed explanation will be made of the related art as background with reference to FIG. 1.

Figure 1:
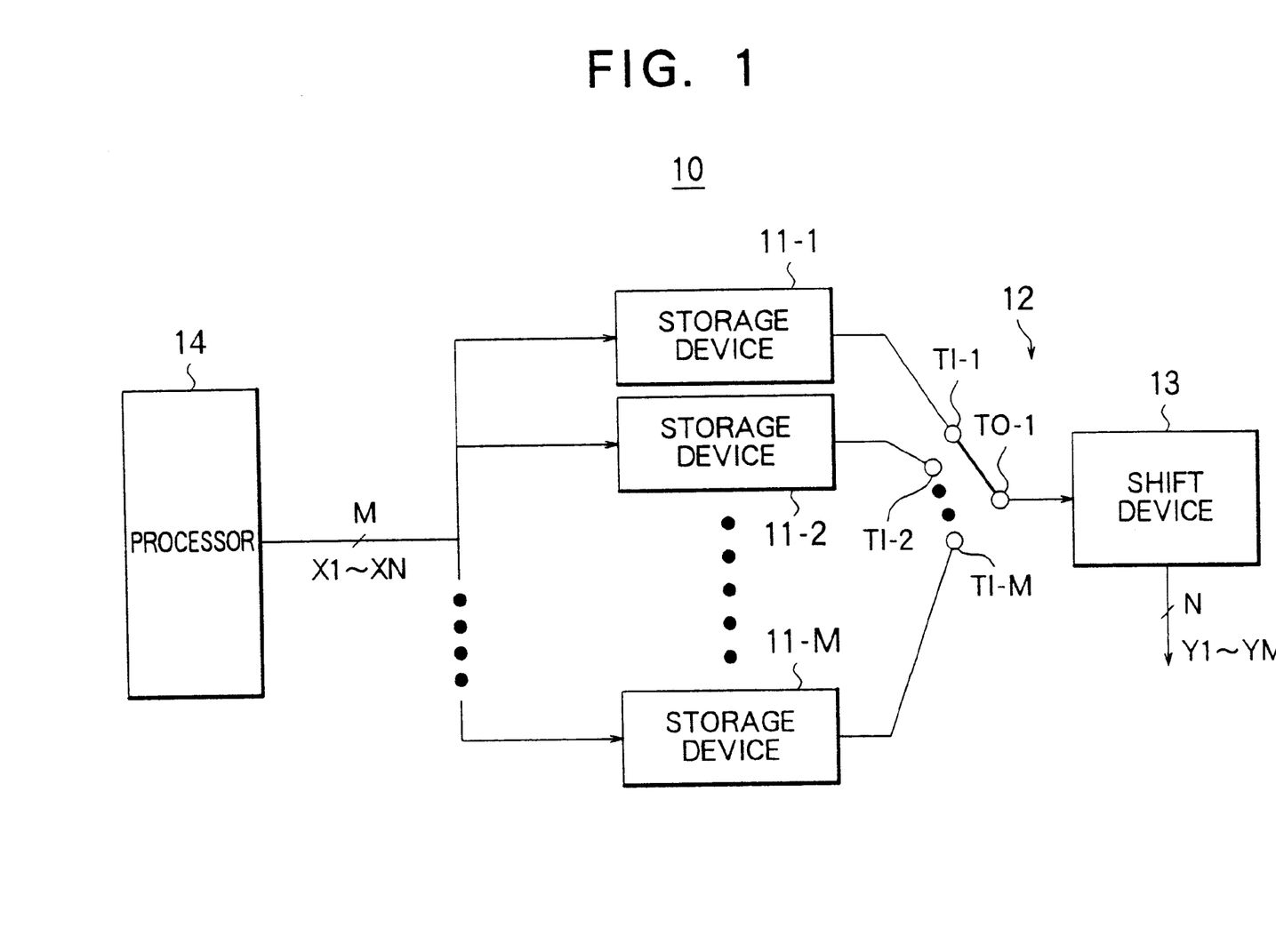
FIG. 1 is a block diagram of the configuration of a transposition processing device according to the related art.

FIG. 1 is a block diagram of an example of the configuration of a matrix transposition device of the related art.

As shown in FIG. 1, the matrix transposition device 10 is constituted by storage devices 11-1 to 11-M, a changeover switch circuit 12, and a shift device 13. Further, 14 denotes a processor.

Each of the storage devices 11-1 to 11-M is constituted by for example a one-input one-output random access memory (RAM), has storage regions which can be designated by N number of addresses from 1 to N, and can execute one write operation and one read operation.

The changeover switch circuit 12 has M number of input terminals TI-1 to TI-M respectively connected to the output terminals of the storage devices 12-1 to 12-M and one output terminal TO-1 connected to the input terminal of the shift device 13 and successively connects the output terminal TO-1 to the input terminals TI-1 to TI-M to input the element data of the column vectors stored in the storage devices 11-1 to 11-M to the shift device 13.

The shift device 13 successively reads the M number of element data via the changeover switch circuit 12. When finishing reading them, it outputs the M number of element data to the determined outputs as the column vectors Y1 to YM in parallel according to the order of reading.

The processor 14 applies primary transformation processing to the input matrix data, divides the same to column vectors X1 to XN, and outputs the result to the storage devices 11-1 to 11-M. Further, for example, the processor 14 receives the column vectors Y1 to YM from the shift device 13 subjected to the transposition action and further applies primary transformation to them.

Next, an explanation will be made of the procedure of obtaining the transposed output by using these components.

Here, an explanation will be made of the procedure of inputting an M×N matrix X and obtaining an N×M matrix Y as transposition thereof.

The input matrix X is divided into the column vectors X1 to XN at the processor 14. The column vectors are then sequentially input to the storage devices 11-1 to 11-M.

The i-th element (note, i is an integer of 1 to M) of the column vector Xk (note, k is an integer of 1 to N) is written in the storage region of the address k of the storage device 11-i for storage. At this time, the elements of Xk are simultaneously written in the storage devices. By repeating this operation by N number of times from k=1 to k=N, all elements of X are stored in the storage devices 11-1 to 11-M.

Next, addresses 1 to N of the storage device 11-i are read and sequentially input to the shift device 13 via the changeover switch circuit 12, whereupon the row vector T(X)i of X is output to the output of the shift device 14.

Here, T(X) is assumed to be a function expressing the transposition of the matrix. At the point of time when this operation is ended, the row vector T(X)i, that is, the column vector Yi of the output Y, is output to the output of the shift device 13. By repeating this operation i=1 to i=M number of times, the output column vectors Y1 to YM are output, and all elements of the output matrix Y will be output.

As explained above, in the matrix transposition operation, data must be read N number of times until the data of the amount of one column become complete. This operation has become an obstacle when desiring to perform the two-dimensional orthogonal transformation etc. at a high speed or in a short time.

Next, an explanation will be made of an embodiment of the present invention by referring to the drawings.

Figure 2:
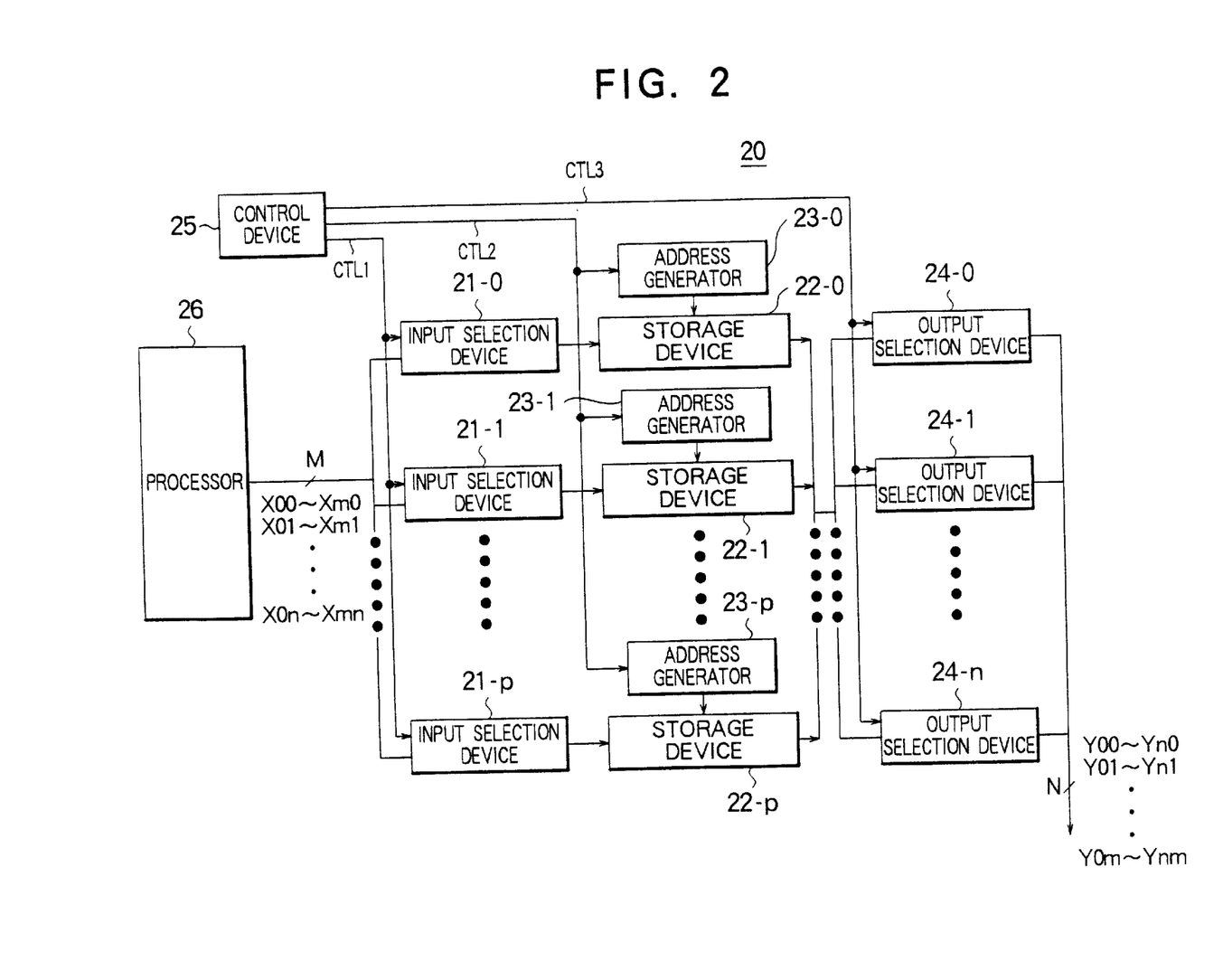
FIG. 2 is a block diagram of the configuration of an embodiment of a matrix transposition device according to the present invention.

FIG. 2 is a block diagram of the configuration of a matrix transposition device according to the present invention.

As shown in FIG. 2, a matrix transposition device 20 is constituted by input selection devices 21-0 to 21-p, storage devices 22-0 to 22-p, address generators 23-0 to 23-p, output selection devices 24-0 to 24-n, and a control circuit 25. Further, in the figure, 26 denotes a processor.

Note that, in the present embodiment, for making the explanation easier to understand, it is assumed that the suffix for designating an element of a matrix, selection device, storage device, etc. starts from not 1, but 0. Elements of the input matrix X are expressed as Xij (i=0 to m, j=0 to n). For example, the (1, 2) element of X in the normal expression, that is, the second element from the left of the uppermost part of the matrix is indicated as X01. This same is true also for the output matrix Y. Of course, Xij and Yji become the same value.

Further, below, it is assumed that P=M and Q=N where $M \geq N$, and P=N and Q=M where $M \leq N$. n=N-1, m=M-1, p=P-1, and q=Q-1 are set.

The input selection devices 21-i (i=0 to p) respectively independently select and output any elements Xjk (j=0 to m) of the input column vectors Xk (k=0 to n) in accordance with a first control signal CTL1 from the control device 25. The output terminals of the input selection devices 21-i are connected to the input terminals of the storage devices 22-i.

Each of the storage devices 22-i (i=0 to p) is constituted by for example a one-input and one-output RAM, has Q number of storage regions which can be designated by Q number of addresses ADR0 to ADRq from 0 to q generated by the address generators 23-i, and executes one write operation and one read operation.

The address generators 23-i (i=0 to p) can output one series of addresses ADR0 to ADRq respectively independently having regions of from 0 to q in accordance with a second control signal CTL2 from the control device 25, can respectively independently set address values of from 0 to q preceding the input procedure and output procedure, and increase one by one or decrease one by one the address value by the remainder system using Q as the modulus for every operation during the input procedure or output procedure.

The output selection devices 24-j (j=0 to n) are devices which respectively independently select and output the outputs of any storage devices in accordance with a third control signal CTL3 from the control device 25 and successively output the column vectors Yh (h=0 to m) as the final output matrix of this device whenever the outputs of the storage devices 22-i are input.

When storing input column vectors Xk (k=0 to n) in the storage devices 22-i, the control device 25 outputs the first control signal CTL1 to the input selection devices 21-i and, at the same time, outputs the second control signal CTL2 to the address generators 23-i.

In this case, the series of output addresses ADR simultaneously generated by the address generators 23-0 to 23-p are respectively different so that for example data is sequentially stored in the storage region 0 toward the storage region p of all storage devices 22-0 to 22-p.

Further, when reading the element data stored in the storage devices 22-i, the second control signal CTL2 is output to the address generators 23-i and, at the same time, the third control signal CTL3 is output to the output selection devices 24-j.

In this case, the series of output addresses ADR simultaneously generated by the address generators 23-0 to 23-p are respectively different so that for example any column vectors Yh can be obtained.

Namely, in this example, the writing of data to the storage devices 22-0 to 22-p is carried out together in a so-called vertical direction in all storage devices, and the reading is carried out by selective address designation.

The processor 26 applies the primary transformation processing with respect to the input matrix data and outputs the column vectors X00 to Xm0, X01 to Xm1, . . . , and X0n to Xmn to the input selections device 21-i. Further, for example, receiving the column vectors Y00 to Y0n, Y01 to Yn1, . . . , Y0m to Ynm, the processor 25 further applies primary transformation.

Below, an explanation will be made of the procedure of transforming an M×N matrix X to an N×M matrix Y by using the above components based on the control signals CTL1, CTL2, and CTL3 of the control device 25.

This procedure executes the later defined reading procedure after executing the later defined writing procedure.

The writing procedure will be defined here first.

First, by the first and second control signals CTL1 and CTL2, the input selection devices 21-0 to 21-p and the address generators 23-0 to 23-p are initialized preceding the writing of the input column vectors into the storage devices. This will be defined as the write operation initialization.

Next, one input column vector is written into the memory devices 22-0 to 22-p. This will be defined as a column vector write operation.

Next, the state of the input selection devices 21-0 to 21-p and the address generators 23-0 to 23-p is updated preceding the next column vector write operation. This will be defined as a write operation update.

The writing procedure can be defined by the above definitions. The writing procedure is a procedure for repeatedly executing a column vector write operation and a write operation update by the number of input column vectors after executing the writing operation initialization.

The reading procedure will be defined next.

First, the address generators 23-0 to 23-p and the output selection devices 24-0 to 24-n are initialized preceding the reading of the output column vectors from the storage devices 22-0 to 22-p by the second control signal CTL2 and third control signal CTL3. This will be defined as a read operation initialization.

Next, one output column vector is read from the storage devices 22-0 to 22-p. This will be defined as a column vector read operation.

Next, the state of the address generators 23-0 to 23-p and the output selection devices 24-0 to 24-n is updated preceding the next column vector read operation. This will be defined as a read operation update.

The reading procedure can be defined by the above definitions. The reading procedure is a procedure for repeatedly executing a column vector read operation and a reading operation update by the number of output column vectors after executing the read operation initialization.

Next, a more detailed explanation will be made of the concrete operation resulting from the above configuration based on the above definitions.

As the write operation initialization, the first control signal CTL1 is set so as to select the input Xi0 (i=0 to p) with respect to the input selection devices 21-i (i=0 to p), the second control signal CTL2 is set so as to generate a remainder obtained by dividing i by Q as the address with respect to the address generators 23i (i=0 to m), and if the address generator 23-i (i>M) exists, an address ADR0 is generated.

The column vector write operation is performed as in the above definition. Note, concerning the state of the input selection devices 21-i (i=0 to p) at the time of execution of a column vector write operation in which the write element is set to be a larger value than m, the write operation is not executed and the internal state of the storage devices 22-i does not change.

As the write operation update, 1 is subtracted from the state of the input selection devices 21-i (i=0 to p) in the meaning of addition and subtraction using P as a modulus. At this point of time, when it is assumed that the state of the input selection devices 21-i is s(i), 1 is subtracted in the meaning of addition and subtraction using Q as a modulus with respect to the address generators 23-i in which 0≦s(i) <M. The state is not changed with respect to other address generators.

As the read operation initialization, the third control signal CTL3 is set so as to select the output of the storage devices 22-i (i=0 to p) with respect to the output selection devices 24-j (i=0 to n), and the second control signal CTL2 is set so as to generate 0 as the address ADR with respect to the address generators 23-i (i=0 to n).

The column vector read operation is carried out as in the above definitions.

As the read operation update, before the update of the input selection devices 24-j, the second control signal CTL2 is set so as to perform i+1 for the address generators 23-i in the remainder system using i=0 to n and P as a modulus with respect to the address generators 23-i if the state of the output selection devices 24-j (that is, the output selection device 24-0 if j=0, and the output selection devices 24-n if j=1 or the like) is equal to p-n and increases the state of the address generators 23-i (i=0 to n) by 1 the remainder system using Q as a modulus in other cases.

By executing the above procedure in the order as described above, all procedures are completed.

Next, a more detailed explanation will be made of the operation in relation to FIGS. 3A to 3F by taking as an example an 8×8 two-dimensional DCT.

In FIGS. 3A to 3F, the 8×8 matrix shows eight 1×8 storage devices (p=7 in the present example) each of which has eight storage regions and can designate any of the eight storage regions by the addresses ADR0 to ADR7. In the figures, the lateral direction is the address direction, and the vertical direction is the direction of arrangement of the storage devices.

Figure 3A:
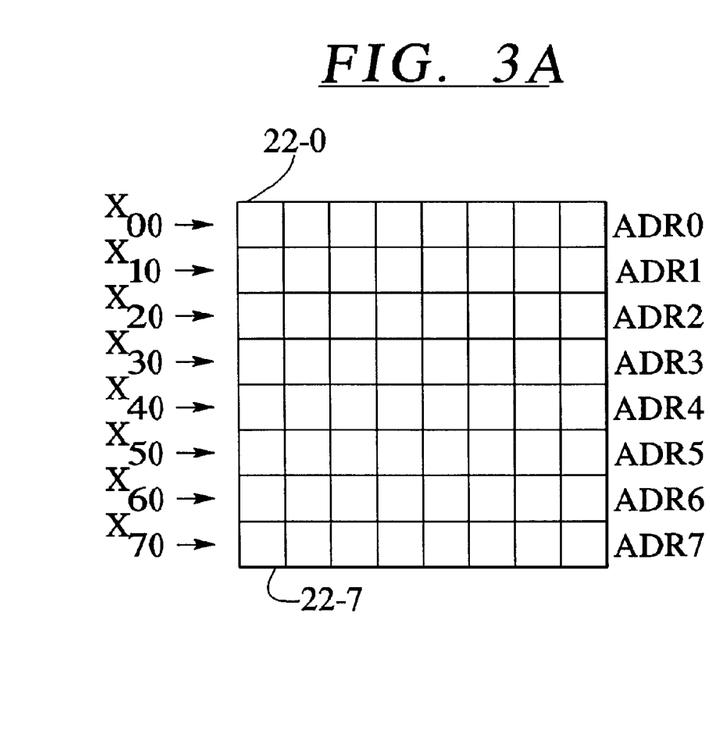
FIG. 3A is a view of an initial state.

FIG. 3A shows an initial state. At this time, the input is column vectors $X_{00}$ to $X_{70}$, and the address designation by the address generators (23-0 to 23-7) is ADR0 to 7 in order from the upper storage device 22-0.

Figure 3B:
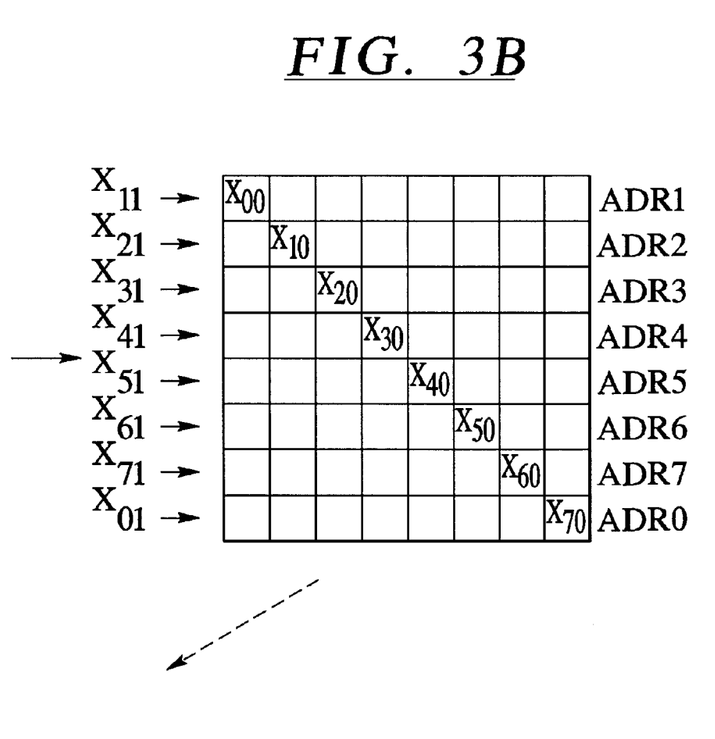
FIG. 3B is a view of the state where data is stored from the state of FIG. 3A.

As a result, as shown in FIG. 3B, the input column vectors $X_{00}$ to $X_{70}$ are stored in the form of diagonal lines. Then, the next input at this time is the column vectors $X_{01}$ to $X_{71}$. The elements of the input column vectors are circularly shifted as shown in the figure. In the address designation, as shown in FIG. 3B, the addresses are circularly shifted by one. Namely, the address designation of the first device is ADR1, the second device is ADR2, the third device is ADR3, the fourth device is ADR4. the fifth device is ADR5, the sixth device is ADR6, the seventh device is ADR7, and the eighth device is ADR0.

Figure 3C:
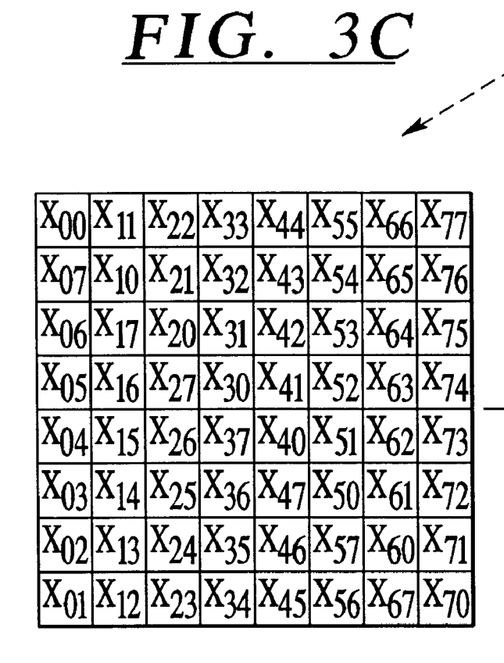
FIG. 3C is a view of a state where all data are stored in storage regions.

In this way, the addresses are circularly shifted one by one for every input of eight column vectors, and, as shown in FIG. 3C, all data are stored in 64 storage regions.

Figure 3D:
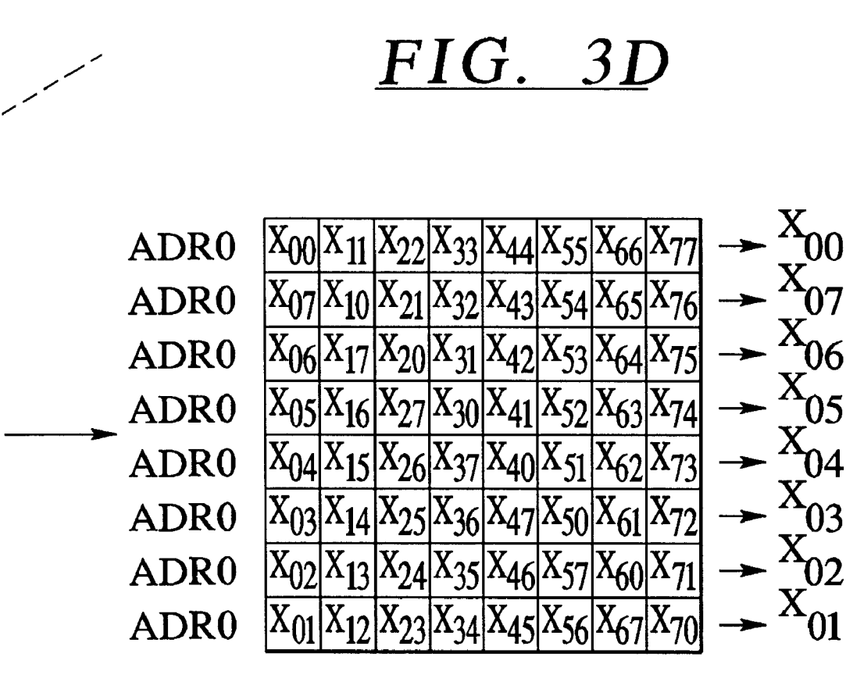
FIGS. 3D to 3F are explanatory views of a reading operation.

Next, the address designation by the address generators (23-0 to 23-7) in the case of a read operation is ADR0 with respect to all of the eight storage devices as shown in FIG. 3D. As a result, as shown in FIG. 3D, all data $X_{00}$ to $X_{07}$, of the first column in the matrix of the storage regions are read.

Figure 3E:
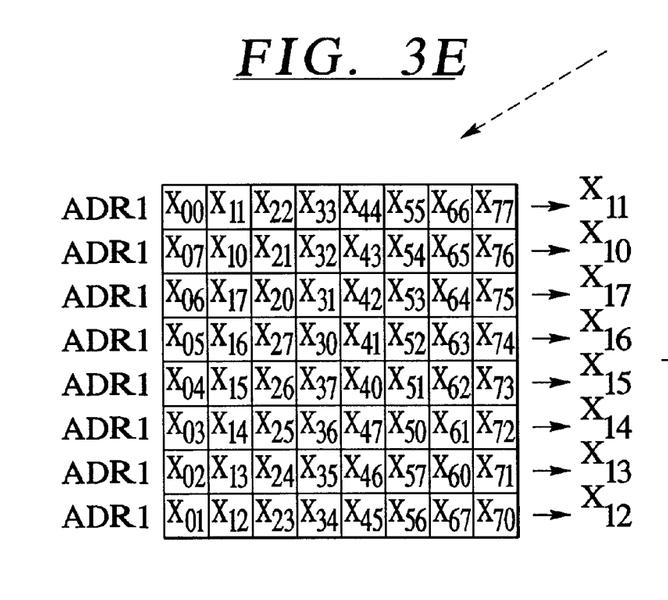

Next, the address designation by the address generators (23-0 to 23-7) is the address ADR1 with respect to all of the eight storage devices as shown in FIG. 3E. As a result, as shown in FIG. 3E, all data $X_{10}$ to $X_{17}$, of the second column in the matrix of the storage regions are read.

Figure 3F:
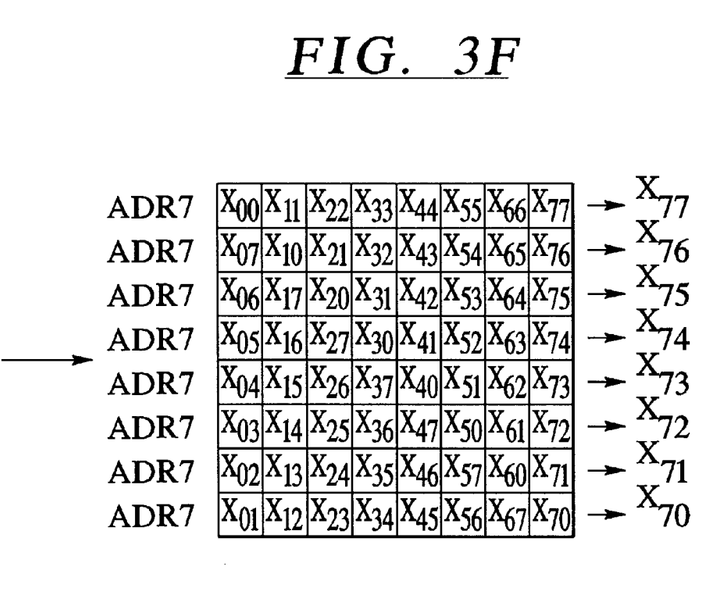

Similarly, the same address designation is sequentially carried out with respect to all storage devices. As shown in FIG. 3F, the data $X_{70}$ to $X_{77}$ of the eighth column are read out by the designation of the address ADR7.

In this way, the overhead of the transposition can be eliminated by storing eight data columns in eight storage devices 22-0 to 22-7 while circularly shifting addresses one by one and designating the addresses in order from the first column when reading the data.

Note that the example of FIGS. 3A to 3F relates to circularly shifting the addresses for storing the column vectors in eight storage devices and to designating the addresses in order from the first column when reading the data, but a configuration reverse to the former is also possible.

Namely, as shown in FIGS. 4A to 4F, it is also possible to configure the system so as to circularly shift the eight data columns for storage and circularly shifting the addresses when reading the data.

Figure 4A:
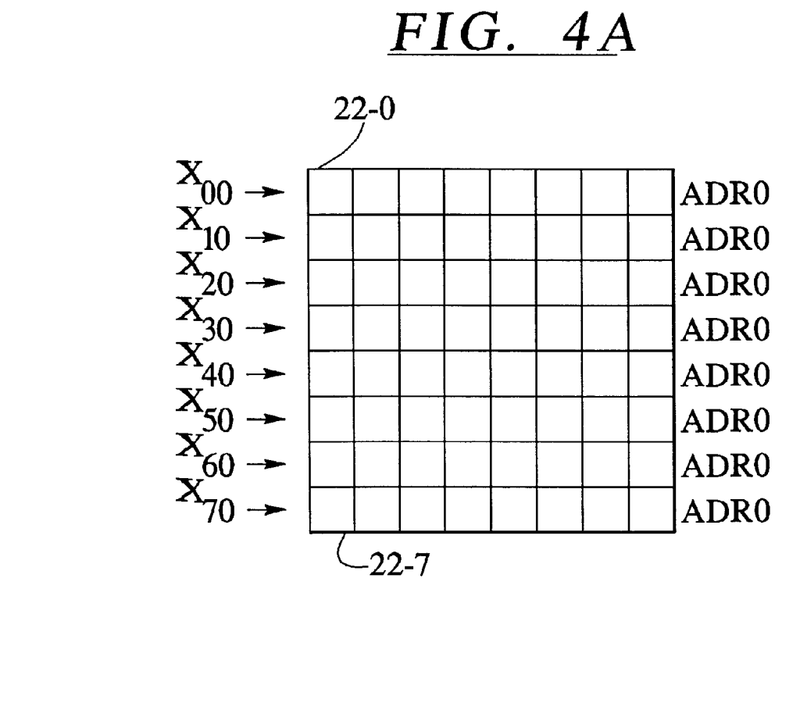
FIG. 4A is a view of an initial state.

FIG. 4A shows the initial state. At this time, the input is column vectors $X_{00}$ to $X_{70}$, and the address designation by the address generators (23-0 to 23-7) is ADR0 with respect to all of the eight storage devices.

Figure 4B:
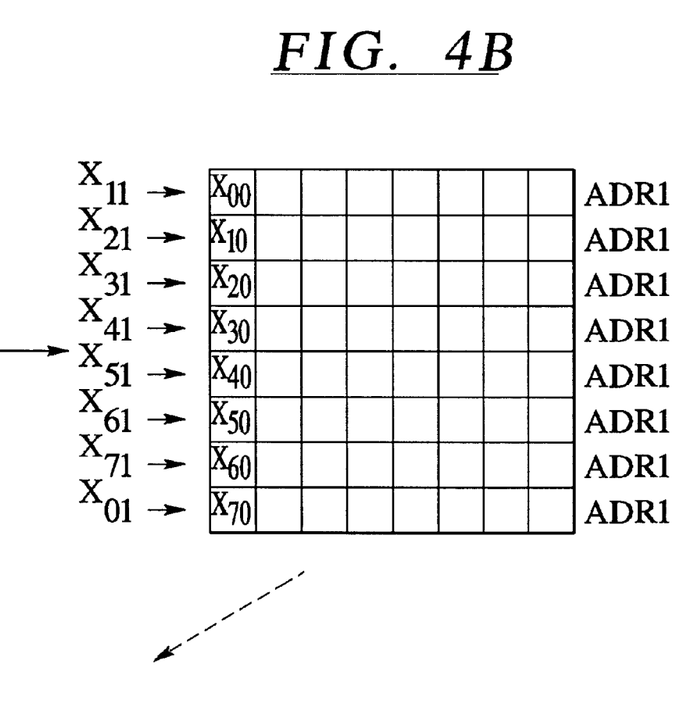
FIG. 4B is a view of the state where data is stored from the state of FIG. 4A.

As a result, as shown in FIG. 4B, the input column vectors $X_{00}$ to $X_{70}$ are stored in the first column in the matrix of the storage regions. The next input at this time is the column vectors $X_{01}$ to $X_{71}$, and the address designation is ADR0 with respect to all of the eight storage devices as shown in FIG. 4B.

Figure 4C:
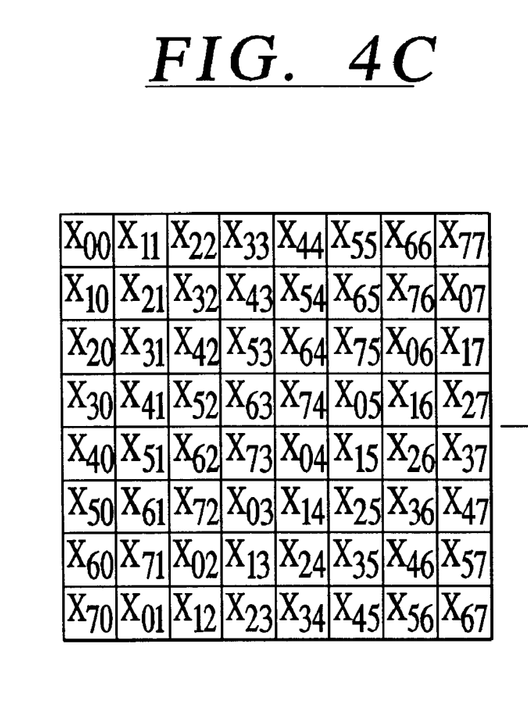
FIG. 4C is a view of a state where all data are stored in storage regions.

In this way, as shown in FIG. 4C, all data of the eight column vectors are sequentially stored in the 64 storage regions.

Figure 4D:
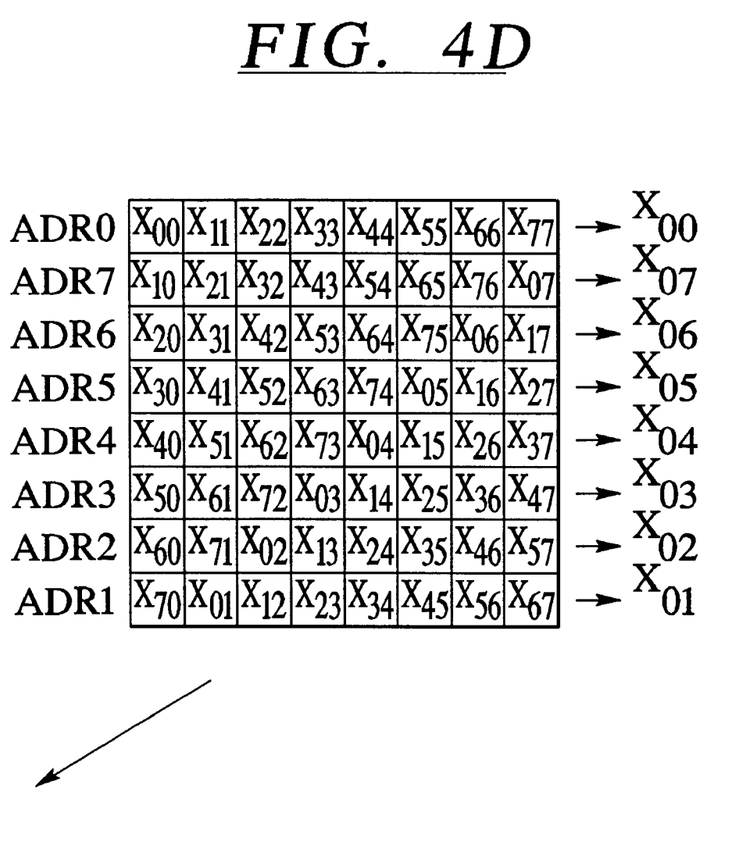
FIGS. 4D to 4F are explanatory views of a reading operation.

When carrying out the read operation, the address designation by the address generators (23-0 to 23-7) is selectively carried out as shown in FIG. 4D. Namely, the address designation of the upper storage device 22-0 is ADR0, the second device is ADR7, the third device is ADR6, the fourth device is ADR5, the fifth device is ADR4, the sixth device is ADR3, the seventh device is ADR2, and the eighth device is ADR1.

As a result, as shown in FIG. 4D, all data $X_{00}$ to $X_{07}$ of the first column in the matrix of the storage regions are read.

Figure 4E:
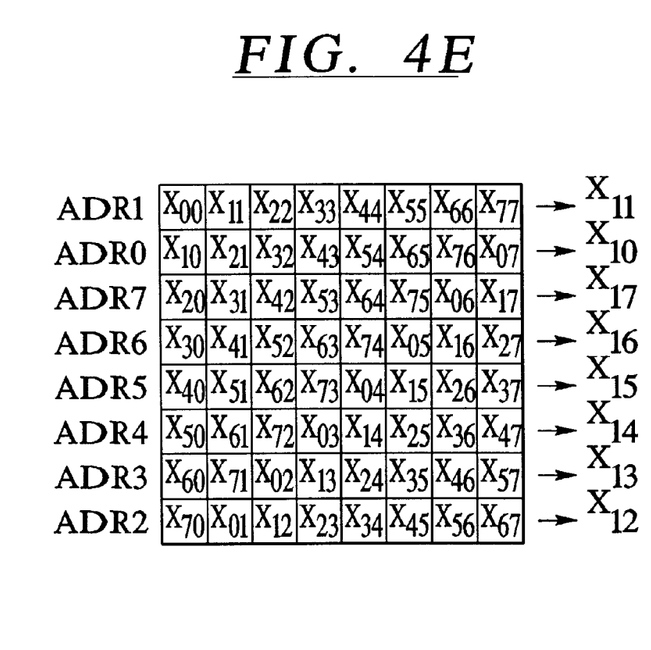

Next, as shown in FIG. 4E, the address designation is carried out while circularly shifted. Namely, the address designation of the upper storage device 22-0 is ADR1, the second device is ADR0, the third device is ADR7, the fourth device is ADR6, the fifth device is ADR5, the sixth device is ADR4, the seventh device is ADR3, and the eighth device is ADR2.

Figure 4F:
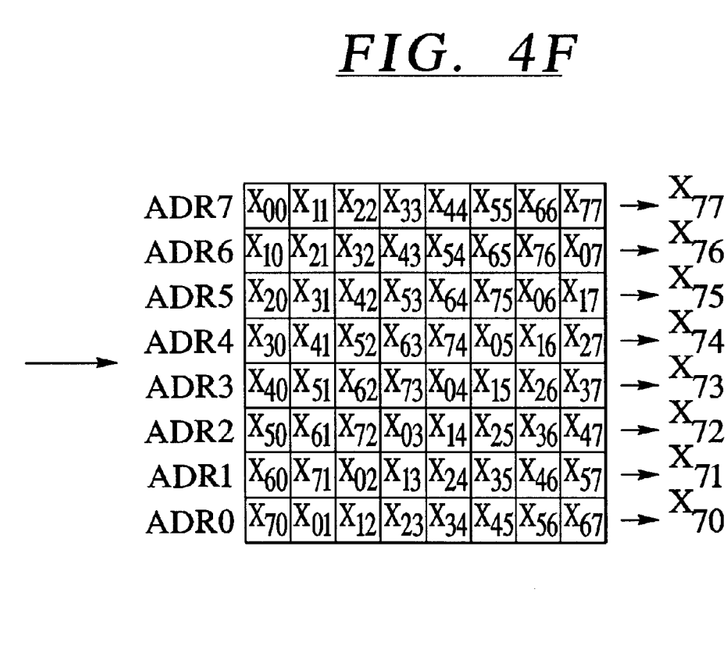

The address designation is similarly carried out while being circularly shifted one by one. As shown in FIG. 4F, by the designation of the address ADR7, the data $X_{70}$ to $X_{77}$ of the eighth column are read out. In the address designation in this case, the first device is ADR7, the second device is ADR6, the third device is ADR5, the fourth device is ADR4, the fifth device is ADR3, the sixth device is ADR2, the seventh device is ADR1, and the eighth device is ADR0.

In this way, by constituting the system so that eight data columns are circularly shifted for storage and so that the addresses are circularly shifted when reading the data, the overhead of transposition can be eliminated.

As explained above, according to the present embodiment, there is provided a plurality of storage devices 22-0 to 22-p arranged so as to be able to input input column vectors in parallel and to be able to output output column vectors in parallel, the sum of the address ranges being able to store all element data of the input matrix; a plurality of input selection devices 21-0 to 21-p provided respectively corresponding to the plurality of storage devices, capable of selecting one numerical value input from among a plurality of parallel numerical value inputs, and inputting respectively selected numerical values to corresponding storage devices; a plurality of address generators 23-0 to 23-p capable of designating independent addresses with respect to the plurality of storage devices; output selection devices 24-0 to 24-n capable of respectively independently selecting outputs of any storage devices; and a control device 25 which controls the input selection devices and the address generators so that elements of any input row vectors are stored in different storage devices at the time of input and controls the address generators and output selection devices so that any transposed output column vectors are output in parallel while maintaining the predetermined order and the order of elements in the determined column vectors in accordance with the matrix elements stored in the plurality of storage devices at the time of output, therefore there is no waste in time accompanied with the shift operation at the time of matrix transposition operation as existed in the system of the related art, a high speed transposition operation can be realized, and the processing such as two-dimensional orthogonal transformation can be raised in speed.

Note that, the present invention is not limited to only these embodiments. Various modifications can be considered so far as the following restrictions are satisfied: the number of the storage devices and input selection devices is enough to input the input column vectors in parallel; the number of the storage devices is enough to output the output column vectors in parallel from the output selection devices; the sum of the address ranges possessed by the storage devices is enough to store all elements of the input matrix; the input selection devices and the address generators at the time of input are controlled so that elements of the input row vectors are stored in different storage devices; and the output selection devices and the address generators at the time of output are controlled so that the transposed output column vectors are output in parallel while maintaining the predetermined order and the order of elements in the determined column vectors in accordance with the stored matrix elements.

Further, it is also possible to input and output a rectangular matrix in the present matrix transposition device and possible to use the device in for example a specialized processing device for processing two-dimensional orthogonal transformation, a specialized processing device for processing the two-dimensional orthogonal transformation used in an image compression apparatus or image expansion apparatus, or part of a general purpose processing device which sometimes performs two-dimensional orthogonal transformation.

What is claimed is:

1. A matrix transposition device for applying a transposition action on input column vectors to obtain output column vectors, comprising:

a plurality of storage devices arranged so as to be able to receive as their inputs the input column vectors in parallel and so as to be able to output output column vectors in parallel, the sum of the address ranges able to store all element data of the input matrix and a controlling means for storing element data of any input row vectors in different storage devices and outputting any transposed output column vectors in parallel while maintaining a determined order and an order of element data in the determined column vectors in accordance with the stored matrix elements.

2. A matrix transposition device as set forth in claim 1, wherein:

the plurality of storage devices are arranged so that the storage regions form a matrix shape and the controlling means stores the element data forming one column vector in storage regions of different column addresses in the plurality of storage devices while circularly shifting the addresses and performs an address designation in the same column units of the matrix to output parallel output vectors.

3. A matrix transposition device as set forth in claim 1, wherein:

the plurality of storage devices are arranged so that the storage regions form a matrix shape and the controlling means stores the element data forming one column vector in storage regions of the same column address in the plurality of storage devices while shifting a plurality of data columns and circularly shifts the addresses to outputs parallel output vectors.

4. A matrix transposition device as set forth in claim 1, wherein a rectangular matrix is input and output.

5. A matrix transposition device for applying a transposition action on input column vectors to obtain output column vectors, comprising:

a plurality of storage devices arranged so as to be able to receive as their inputs the input column vectors in parallel and so as to be able to output output column vectors in parallel, the sum of the address ranges able to store all element data of the input matrix;

a plurality of selecting means each provided corresponding to one of the plurality of storage devices, capable of selecting one numerical value input from among a plurality of parallel numerical value inputs, and inputting the respectively selected numerical values to the corresponding storage device;

a plurality of address generating means capable of designating independent addresses with respect to the plurality of storage devices; and a controlling means for controlling the selecting means and address generating means so that the elements of any input row vectors can be stored in different storage devices at the time of input and controlling the address generating means so that any transposed output column vectors can be output in parallel while maintaining a predetermined order and order of elements in the determined column vectors in accordance with the matrix elements stored in the plurality of storage devices.

6. A matrix transposition device as set forth in claim 5, wherein:

it has output selection devices capable of respectively independently selecting outputs of any storage devices; and the controlling means controls the output selection devices so as to successively output the output column vectors of the final output matrix whenever an output of the storage device is input.

7. A matrix transposition device as set forth in claim 5, wherein:

the plurality of storage devices are arranged so that the storage regions form a matrix shape and the controlling means stores the element data forming one column vector in storage regions of different column addresses in the plurality of storage devices while circularly shifting the addresses and performs an address designation in the same column units of the matrix to output parallel output vectors.

8. A matrix transposition device as set forth in claim 5, wherein:

the plurality of storage devices are arranged so that the storage regions form a matrix shape and the controlling means stores the element data forming one column vector in storage regions of the same column address in the plurality of storage devices while shifting a plurality of data columns and circularly shifts the addresses to outputs parallel output vectors.

9. A matrix transposition device as set forth in claim 5, wherein a rectangular matrix is input and output.

* * * * *